US008223805B2

(12) United States Patent (10) Patent No.: US 8,223,805 B2
Tapie et al. (45) Date of Patent: *Jul. 17, 2012

(54) METHOD AND DEVICE FOR AUTOMATICALLY COMPENSATING A PHASE SHIFT ON A SYNCHRONISATION SIGNAL RECEIVED BY AN ITEM OF REMOTE EQUIPMENT

(75) Inventors: Thierry Tapie, Rennes (FR); Serge Defrance, Rennes (FR); Luis Montalvo, Domloup (FR)

(73) Assignee: Thomson Licensing, Issy les-Moulineaux (FR)

( * ) Notice: Subject to any disclaimer, the term of this patent is extended or adjusted under 35 U.S.C. 154(b) by 335 days.

This patent is subject to a terminal disclaimer.

(21) Appl. No.: 12/733,515
(22) PCT Filed: Sep. 5, 2008
(86) PCT No.: PCT/EP2008/061761
§ 371 (c)(1),
(2), (4) Date: Mar. 5, 2010
(87) PCT Pub. No.: WO2009/030741
PCT Pub. Date: Mar. 12, 2009

(65) Prior Publication Data
US 2010/0195673 A1 Aug. 5, 2010

(30) Foreign Application Priority Data
Sep. 7, 2007 (FR) ...................... 07 57424

(51) Int. Cl.
*H04J 3/06* (2006.01)
(52) U.S. Cl. ........................ 370/503; 370/516
(58) Field of Classification Search .................. 370/503, 370/507, 516, 521; 709/208; 345/501, 502
See application file for complete search history.

(56) References Cited

U.S. PATENT DOCUMENTS
2009/0175271 A1 7/2009 Tapie et al.
(Continued)

FOREIGN PATENT DOCUMENTS
EP 1471745 10/2004
WO WO 2007/104891 9/2007

OTHER PUBLICATIONS

IEEE Instrumentation and Measurement Society: "IEEE std 1588-2002 IEEE Standard for a Precision clock Synchronization Protocol for Networked Measurement and Control Systems (Part)" IEEE Standards, IEEE, US, Nov. 8, 2002, pp. 10-25,79.
Search Report Dated Jan. 15, 2009.

*Primary Examiner* — Gary Mui
(74) *Attorney, Agent, or Firm* — Robert D. Shedd; Jeffrey M. Navon (57) ABSTRACT

The present invention relates to the domain of video equipment. In particular, the invention relates to a device able to receive packets in a network. The device comprises:
means for receiving packets containing samples realized at a period,
means for regenerating a ramp by means of a loop that delivers a clock,
means for initializing, at every zero-crossing of the ramp, a counter whose rhythm is determined by the clock,
means for generating image cues at every zero-crossing of the counter, and
means for reconstituting a synchronization signal from said image cues,
means for transmitting the synchronization signal to an item of remote equipment to be synchronized. According to the invention, the device comprises:
means for receiving a return synchronization signal identical to the synchronization signal received by the equipment,
means for extracting return image cues from the return synchronization signal,
means for transmitting, to the loop, a sum between a sample and a sample of a signal delivered by the image counter, the samples having been realized at a rate set by the return image cues.

2 Claims, 6 Drawing Sheets

U.S. PATENT DOCUMENTS

2010/0115047 A1* 5/2010 Briscoe et al. ............... 709/208

2010/0315427 A1* 12/2010 Wyatt et al. .................. 345/502

* cited by examiner

PRIOR ART

METHOD AND DEVICE FOR AUTOMATICALLY COMPENSATING A PHASE SHIFT ON A SYNCHRONISATION SIGNAL RECEIVED BY AN ITEM OF REMOTE EQUIPMENT

This application claims the benefit, under 35 U.S.C. §365 of International Application PCT/EP2008/061761, filed Sep. 5, 2008, which was published in accordance with PCT Article 21(2) on Mar. 12, 2009 in English and which claims the benefit of French patent application No. 0757424, filed Sep. 7, 2007.

SCOPE OF THE INVENTION

The present invention relates to the domain of video equipment.

The present invention relates more particularly to a device for the reception of a synchronisation signal on a packet switching network, for example of the IP type, whether the network is wired (for example Ethernet (IEEE802.3)) or wireless (for example IEEE 802.16 D-2004).

PRIOR ART

Progress in the ability of IP networks to transport all types of signal (data or video) has made it possible to use these networks as the "backbone" architecture for video studios. Of capital importance to this evolution is therefore having a single infrastructure for the transport of data. Whereas in the past, several media were necessary to transport different signal types, the multiplexing properties offered by the IP layer enable a reduction in the number of media necessary: an IP network that links the different equipment.

In the prior art, the synchronisation of items of video equipment (cameras, etc.) in a studio is carried out by the transmission of a synchronisation signal commonly called "Genlock" or "Black burst". For example, the Genlock signal comprises two synchronisation signals, one is repeated every 40 ms and indicates the start of the video frame, the other is repeated every 64 µs (for a standard format and less for an HD format) and indicates the start of lines in the video frame. The waveform of the synchronisation signals depends on the format of the image transmitted over the network. For example, for a high definition image, the signal synchronisation has a tri-level form (−300 mV, 0V, +300 mV).

When a synchronisation signal is routed to different equipment to be synchronised by a dedicated coaxial cable, a constant transmission time, without jitter is ensured. From such a signal, all items of equipment are able to reconstruct a timing clock that is specific to its functioning, which guarantees that its functioning is rigorously in phase with all the equipment connected to the same network. For example, two cameras synchronised by a Genlock signal circulating on a dedicated coaxial cable each generate a video with different contents but rigorously in frequency and in phase with one another.

A known disadvantage presented by an IP/Ethernet network is that it introduces a strong jitter in a transmission of signals, and particularly for the transmission of a synchronisation signal. When such a signal is routed by an IP/Ethernet connection to different items of equipment for synchronising, this jitter results in fluctuations in the length of time required for the information carried by the synchronisation signal to reach the equipment.

In the prior art, devices are known for reconstructing, for each camera, a timing clock specific to this camera enabling the jitter to be overcome. The underlying principle of these devices is a high attenuation of the synchronisation signal jitter amplitude at the level of reception. In such a way, it can be guaranteed that an image generated by a camera is rigorously in phase with all of the images generated by neighbouring cameras connected to the same network.

Examples of such devices are described in the international PCT application FR2007/050918, they act on program clock reference (PCR) signals that represent very accurate reference clock signals. These digital signals are sent to cameras across a network so that they can locally reconstruct clock signals that are in phase with the reference clock.

According to the prior art, the reception device comprises:
- means for receiving packets containing samples of the network coming from data sampled every $T_{ech}$ period,
- means for regenerating a counting ramp $CSR\_PCR_1$ using a phase-locked loop $PLL_1$,
- means for initialising a second CPT counter every zero-crossing of said first counter $CSR\_PCR_1$,
- means for generating image cues at every zero-crossing of the said second CPT counter, and
- means for reconstituting a synchronisation signal from said image cues.

The phase-locked loop $PLL_1$ of the reception device acts as a low-pass filter that partially attenuates the jitter present in the samples received $PCR_r$ that have circulated on the network.

However, this international patent request does not mention the problem of an automatic reduction of a synchronisation delay between different items of equipment. Actually, the period for transporting the synchronisation signal produced by the transmission side to an item of synchronising equipment, is specific to each item of equipment. The differences in transport periods introduce phase shifts in the synchronisation of the different equipment. However, these phase shifts are not compensated for in prior art devices.

Prior art does not mention the problem of compensating the phase shift of synchronisation signals reaching different equipment to synchronise that is connected to a network, except for the French patent application—FR0755691. In this last application, the method of carrying out a manual compensation of phase shift synchronisation reaching each item of equipment is described. The technical problem that this invention aims to resolve is to realise an automatic compensation of the phase difference.

SUMMARY OF THE INVENTION

For this purpose, the present invention concerns a device able to receive packets in a packet switching network comprising at least two stations, the said device comprising:
- means for receiving packets containing samples $PCR_r$ from said network, said samples $PCR_r$ coming from data sampled every period $T_{ech}$, where $T_{ech}$ is from a time base synchronised on all the stations of said network,
- means for regenerating a counting ramp $CSR\_PCR_1$ using a phase-locked loop $PLL_1$ also delivering a reconstituted clock $CLK\_out_1$,
- means for initialising, at every zero-crossing of the counting ramp $CSR\_PCR_1$, an image counter CPT, the rhythm of which is determined by the reconstituted clock $CLK\_out_1$,
- means for generating image cues at every zero-crossing of the said counter CPT, and
- means for reconstituting a synchronisation signal $SG_{Dist}$ from said image cues, means for transmitting the synchronisation signal $SG_{Dist}$ to an item of remote equipment to be synchronised EQ, According to the invention, it comprises means for receiving a return synchronisation signal $SG_{Final}$ identical to the synchronisation signal received by the equipment EQ, means for extracting return image cues from the return synchronisation signal $SG_{Final}$, means for transmitting, to the phase-locked loop ($PLL_1$), an amount between the received sample $PCR_r$ and a sample $ECH_1$ of a counting signal $SCPTI_1$ delivered by the image counter CPT, said sampling having been realised at a rate set by the return image cues.

An advantage of the invention is to enable an automatic compensation of the phase shift of synchronisation signals reaching different equipment to synchronise. In so doing, the compensation of the phase shift does not require any human intervention: a working operator is therefore relieved of the compensation task. A second advantage resides in the assurance that any change in the value of the phase shift is compensated: no monitoring of the phase shift value is necessary when a reception device according to the invention is used.

BRIEF DESCRIPTION OF THE DRAWINGS

The invention will be better understood from the following description of an embodiment of the invention provided as an example by referring to the annexed figures, wherein.

DETAILED DESCRIPTION OF THE EMBODIMENTS OF THE INVENTION

Figure 1:
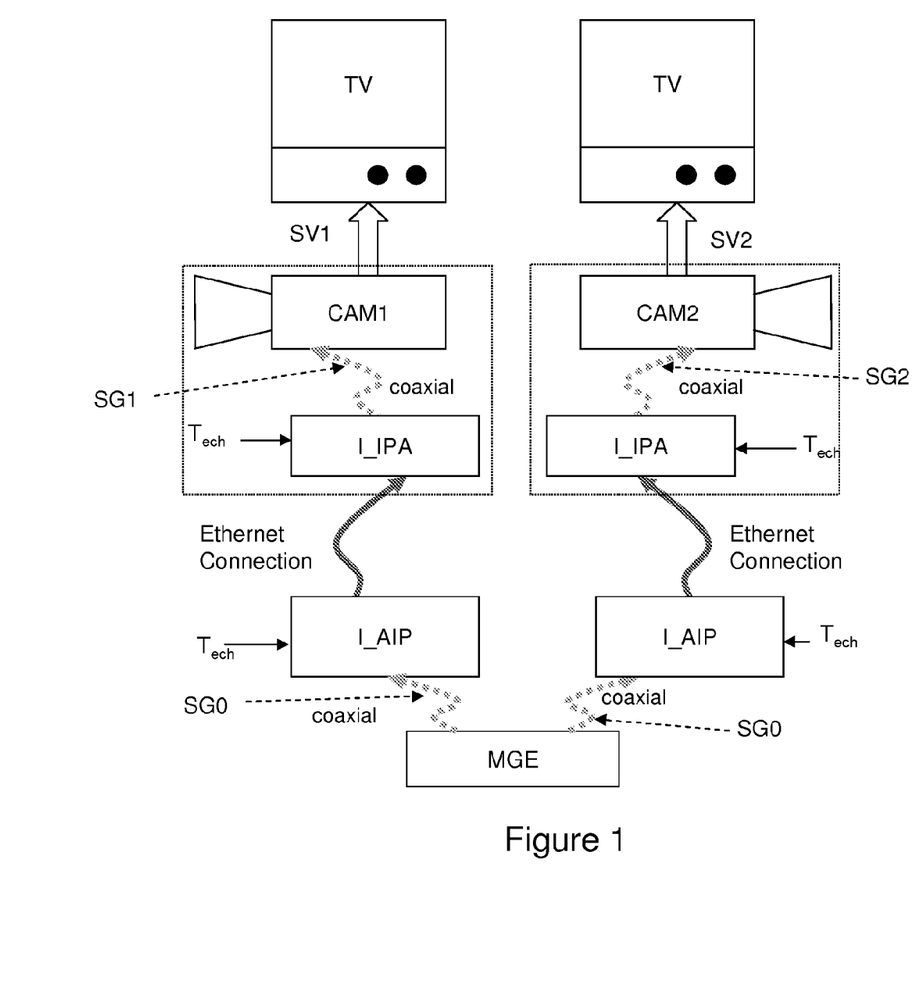
FIG. 1 shows the transmission of genlock information between two cameras linked via an IP/Ethernet network.

The current analogue domain is interfaced with the IP/Ethernet network on the transmission side, and the IP/Ethernet network is interfaced with the analogue domain on the reception side, as illustrated in FIG. 1.

In the same FIG., the transmission side comprises a "Genlock master" MGE that is connected to an IP/Analogue interface I_AIP. The Genlock master MGE sends a Genlock signal SG0 to the interfaces I_AIP.

The reception side is constituted by two cameras (CAM1, CAM2) each connected to an IP/Analogue interface I_IPA. The interfaces I_IPA that will eventually be included in the cameras themselves are responsible for reconstructing the Genlock signals SG1, SG2 intended for cameras CAM1, CAM2. The cameras CAM1, CAM2 each produce a video signal SV1, SV2 that is required to be synchronised perfectly.

The transmission and reception sides are linked together by a packet switching network that is the source of a jitter occurring in the Genlock signal SG0.

A sampling pulse, in the $T_{ech}$ period, is generated from a first synchronisation layer, for example IEEE1588, and is sent to the transmission and reception sides. Indeed, the PTP protocol (Precision Time Protocol) based on IEEE1588 enables synchronisation to be obtained between the equipment connected on the Ethernet network to an order of microseconds.

In other words, all the time bases of every item of equipment progress at the same time with a precision close to the order of microseconds. Each of these time bases can be used in this case to generate its own sampling pulse in the $T_{ech}$ period. Use of the IEEE1588 layer is not a required route. Any system capable of providing sampling pulses to the various items of equipment on the network in the $T_{ech}$ period could be suitable. For example, a 5 ms sampling pulse from a wireless transmission physical layer can be used.

Figure 2:
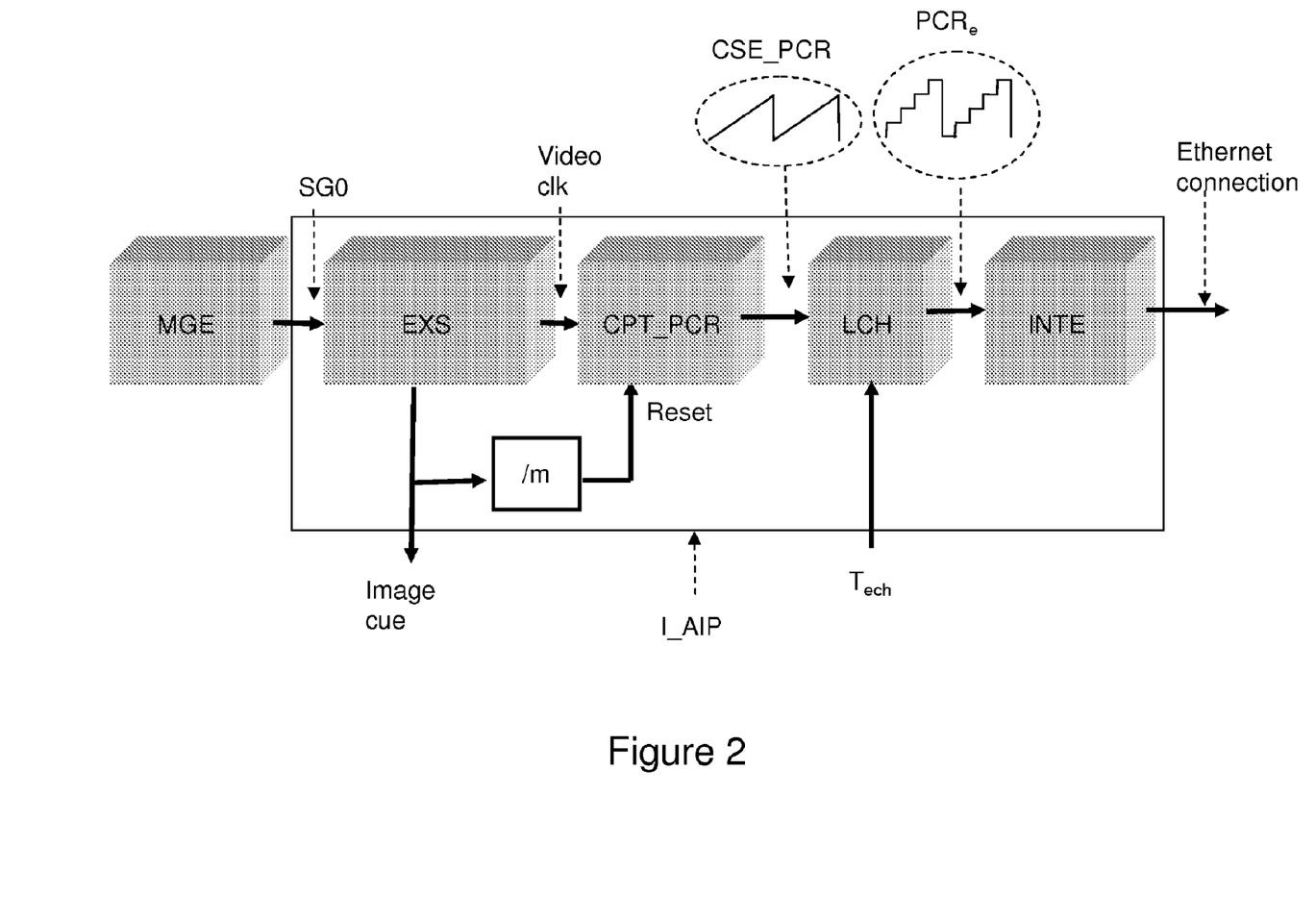
FIG. 2 shows the interfacing between the analogue domain and the IP/Ethernet network.

FIG. 2 details the processing of the Genlock signal SG0 from MGE within the interface I_AIP.

First, a module EXS extracts the synchronisation information from the signal SG0 in order to recover a video timing clock (noted as Clk on FIG. 2). More specifically, the module EXS is responsible for the generation of an image cue at the beginning of each image. Furthermore, the module EXS comprises an image counter, for example a 40 ms counter, which is not shown on FIG. 2. The output of this image counter progresses according to the counting ramp, crossing 0 at each image period, that is every 40 ms in the case of the image counter cited in the aforementioned example.

The image counter delivers a stair-step signal. The steps have a unitary height. The signal range value, that is to say the height corresponding to the difference in level between the highest step and the lowest step is equal to 40 ms·$F_{out}$, where $F_{out}$ is the frequency of the video clock Clk. The counter CPT successively delivers all of the integer values from 0 to 40 ms·$F_{out}$−1.

The timing video clock is used to determine the rhythm of a counter CPT_PCR. The output of the counter CPT_PCR is a counting ramp, whose period is m image periods. Every "m" image, the counter CPT_PCR is reset, that is to say that the counting ramp CSE_PCR is reset to 0.

"Counting ramp" designates a stair-step signal each of whose steps have a unitary height $\Delta C$ (also called count increment). The signal range value, that is to say the height corresponding to the difference in level between the highest step and the lowest step is equal to m.40 ms·$F_{out}$. The counter $CPT\_PCR_1$ delivers successively all of the integer values from 0 to m.40 ms·$F_{out}$−1.

Next, a module LCH samples the counting ramp CSE_PCR every $T_{ech}$ period to produce samples $PCR_e$. These samples $PCR_e$ are sent across the network and travel to the reception side through a network interface (block INTE).

Figure 3:
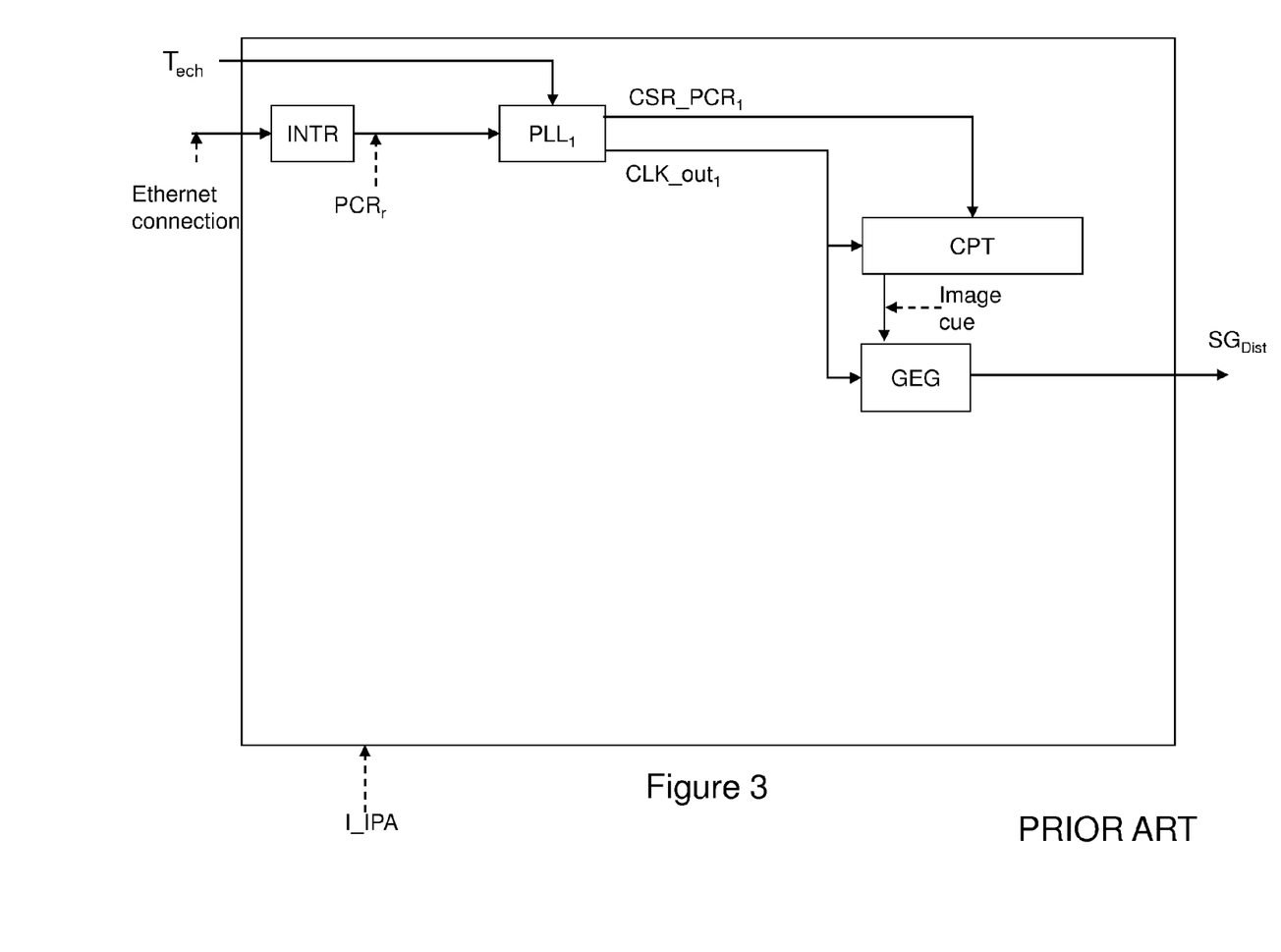
FIG. 3 shows the regeneration of the Genlock signal on the reception side according to the prior art, FIG. 4 diagrammatically shows a phase-locked loop architecture of a reception device according to the prior art.

FIG. 3 shows the reception side according to the prior art. The interface I_IPA recovers the PCR samples that have been sent on the network. These samples $PCR_e$ are received by a network interface (module INTR) with a delay linked to the transport between the transmission device and the reception device: the module INTR produces samples $PCR_r$. The samples $PCR_e$, which are produced at regular $T_{ech}$ intervals on the transmission side, arrive at irregular intervals on the reception side: this is largely due to the jitter introduced during transport on the network. The samples $PCR_r$ are taken into account at regular $T_{ech}$ intervals and hence, the majority of the jitter introduced during packet transport is eliminated.

The imprecision between the transmission and reception sampling times is absorbed by a phase-locked loop $PLL_1$ whose bandwidth is appropriated. The characteristics of the phase-locked loop $PLL_1$ guarantee a reconstituted clock generation $CLK\_out_1$ with a reduced jitter.

The phase-locked loop $PLL_1$ acts as a system receiving $PCR_r$ samples and delivering:
 a reconstituted clock $CLK\_out_1$,
 a counting ramp $CSR\_PCR_1$ and,
 local samples $PCR\_loc_1$.

When the loop $PLL_1$ operates in a steady state, the samples $PCR_r$ are noticeably equal to the samples $PCR\_loc_1$.

The reconstituted clock $CLK\_out_1$ of frequency F determines the rhythm of a CPT image counter similar to the image counter on the transmission side, for example a 40 ms counter.

The image counter CPT delivers a stair-step signal $SCPTI_1$ (not shown). The steps have a unitary height. The signal range value, that is to say the height corresponding to the difference in level between the highest step and the lowest step is equal to 40 ms·$F_{out}$, where $F_{out}$ is the frequency of the reconstituted clock $CLK\_out_1$. The image counter CPT is reset each time the counting ramp $CSR\_PCR_1$ crosses 0. Between two successive initialisations of the counter CPT, it progresses freely and produces an image cue that supplies a local Genlock generator, GEG to produce a reconstituted Genlock signal SG1, SG2 designed to synchronise the cameras CAM1, CAM2.

The reconstructed Genlock signal SG1, SG2 that is generated from the counting ramp $CSR\_PCR_1$ and the reconstituted clock $CLK\_out_1$ is in phase with the Genlock signal SG0 on the transmission side, to the nearest clock pulse.

Figure 4:
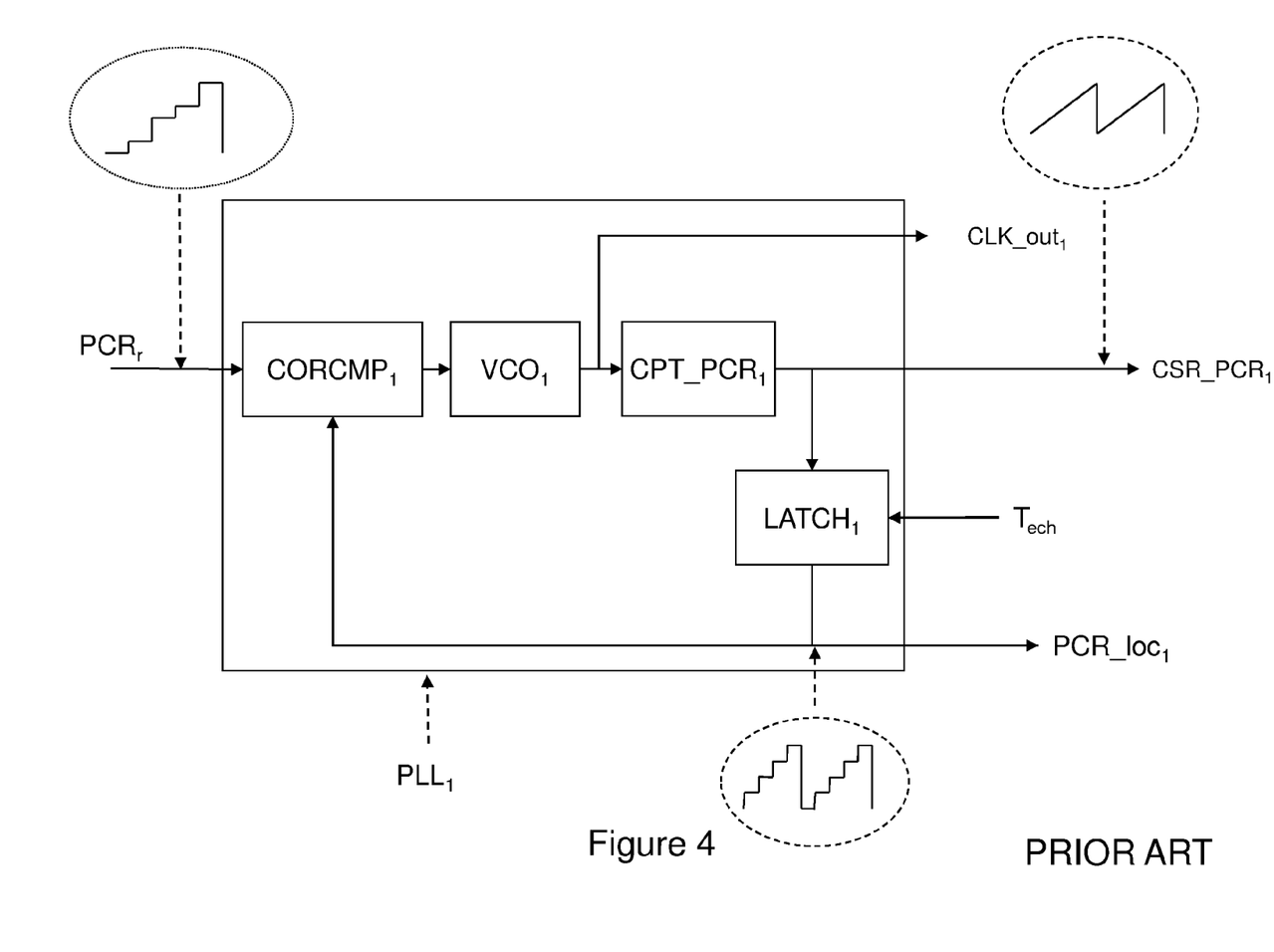

FIG. 4 diagrammatically shows a $PLL_1$ phase-locked loop architecture used in an I_IPA interface according to the prior art.

Figure 5:
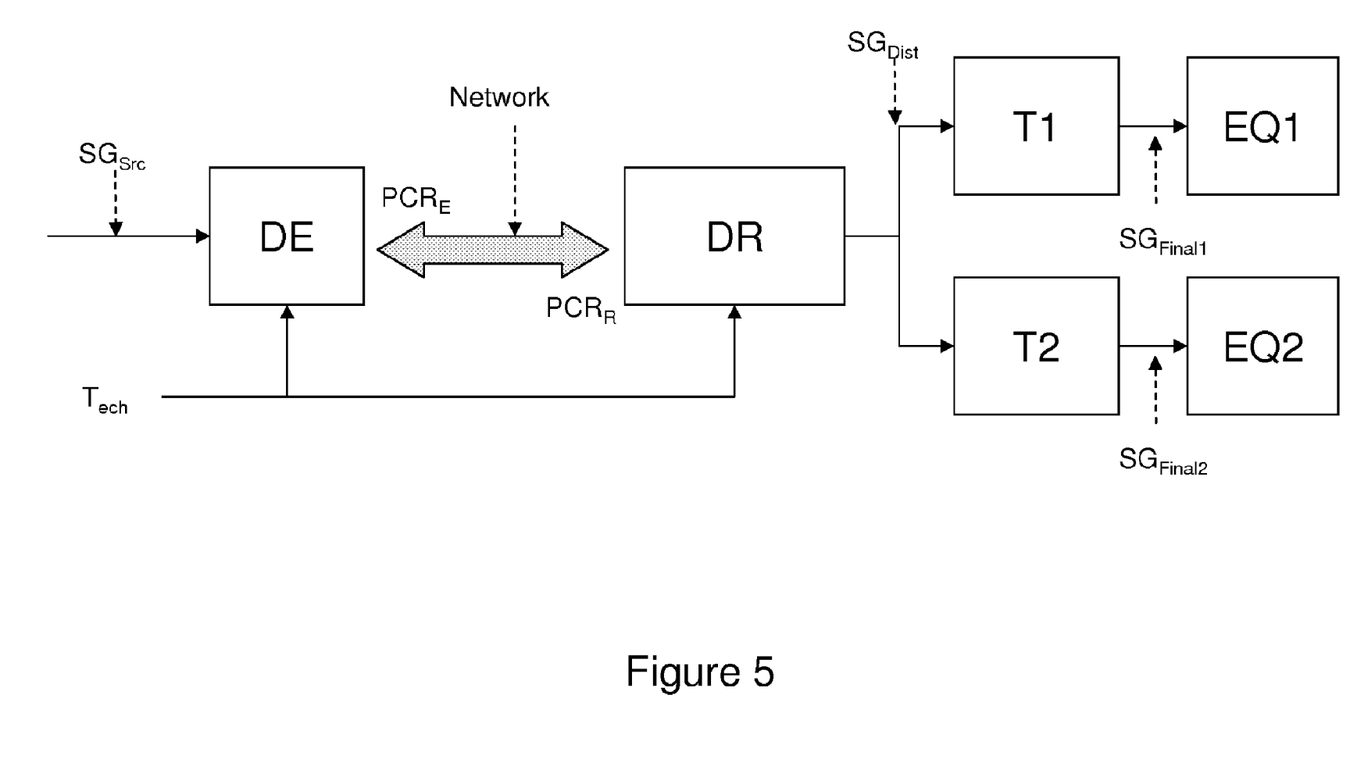
FIG. 5 illustrates an example of a situation in which an item of equipment receives a delayed synchronisation signal $SG_{Final}$ in relation to the synchronisation signal delivered $SG_{Dist}$ by a receiving device according to prior art, FIG. 6 diagrammatically shows a reception device architecture according to the invention.

The phase-locked loop $PLL_1$ comprises:
- a sample comparator $CMP_1$ that compares the samples $PCR_r$ and local samples $PCR\_Loc_1$ and delivers a comparison result of the samples, or an error signal ERR,
- a corrector $COR_1$ that receives the signal ERR and delivers a corrected error signal ERC,
- a configurable oscillator $VCO_1$ that receives the corrected error signal ERC and delivers a reconstituted clock $CLK\_out_1$, the clock $CLK\_out_1$ has a frequency F that depends on the signal ERC,
- a counter $CPT\_PCR_1$ that produces a counting ramp $CSR\_PCR1$ according to a rate that is printed by the reconstituted clock $CLK\_out_1$,
- a support system with the value $LATCH_1$ that generates local samples $PCR\_loc_1$ from the values of the counting ramp $CSR\_PCR_1$ at the times $T_{ech}$, FIG. 5 is an illustrated example of a situation in which a reception device according to the invention presents a special interest.

A first transmission device DE according to prior art receives a first synchronisation signal $SG_0$. It transmits, on a network, samples $PCR_e$ that are notably received by a second reception device (DR) according to prior art. The DE and DR devices are identical to those whose operation has been presented above.

From samples received $PCR_R$ the reception device DR generates a synchronisation signal $SG_{Dist}$, which is synchronous with $SG_{Src}$. The synchronisation signal $SG_{Dist}$ is used to synchronise an item of remote equipment EQ1, for example, a camera. As was mentioned above, it is possible that the synchronisation signal $SG_{Final1}$ actually received by the equipment EQ1 is delayed in relation to $SG_{Dist}$ by the transport to the equipment EQ1. This delay is not automatically compensated by receiving devices according to prior art and it produces undesirable effects when several items of equipment (EQ1, EQ2) are 'synchronised' by such synchronisation signals. For example, when the items of equipment EQ1, EQ2 are cameras, the images produced by the cameras are therefore synchronous but are not presented in phase.

The invention automatically compensates the delay in the synchronisation signal by being based on a comparison between the $SG_{Dist}$ synchronisation signal emitted by the reception device intended for an item of equipment EQ1, EQ2 to synchronise and the synchronisation signal $SG_{Final}$ actually received by the item of equipment (EQ1, EQ2). In this way the synchronisation signals $SG_{Dist}$ arriving on the different items of equipment are synchronous and in phase.

Figure 6:
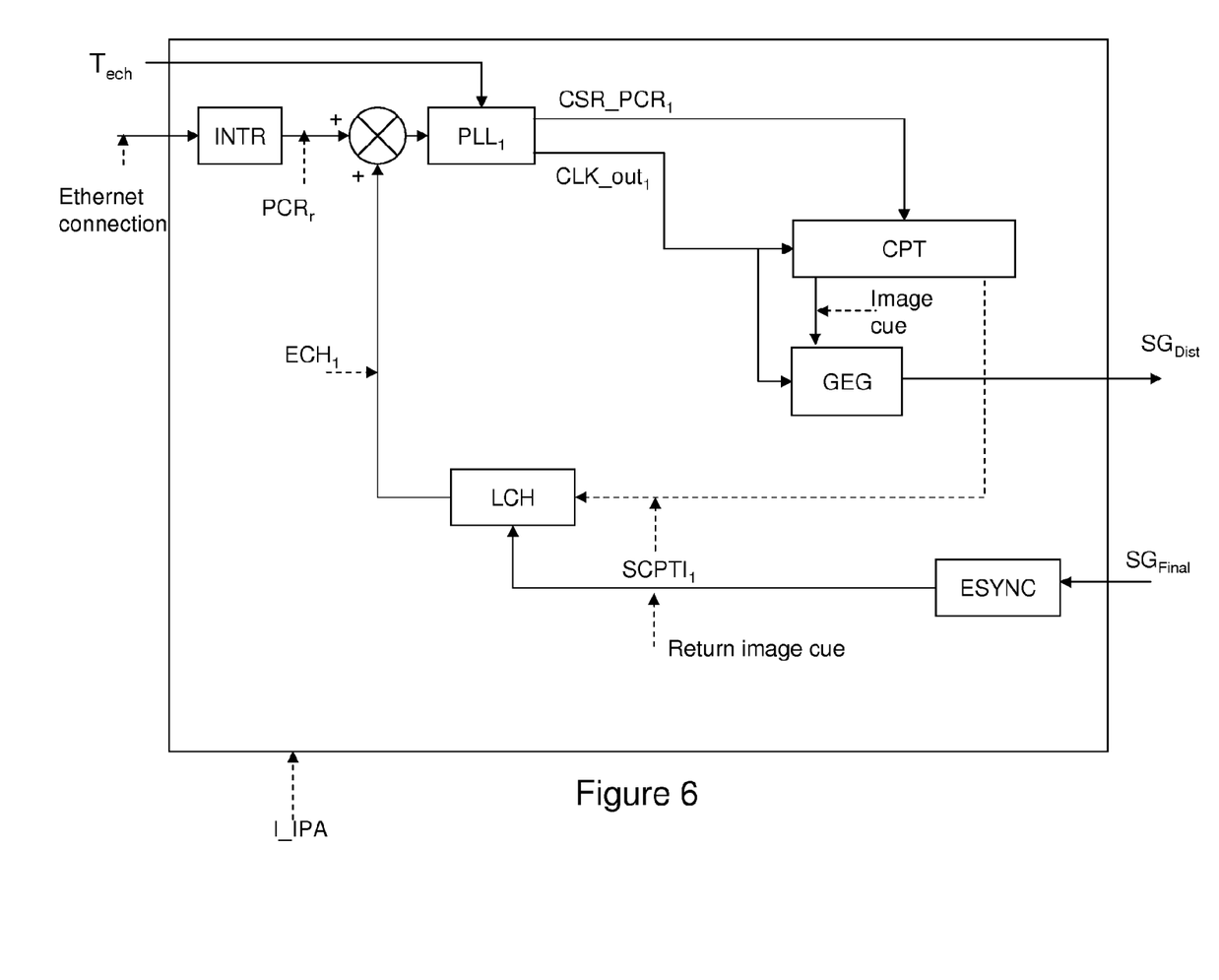

FIG. 6 diagrammatically shows a reception device architecture according to the invention, The reception device according to the invention further comprises:
- An ESYNC module similar to the EXS module of the emitting device according to prior art, the ESYNC module extracts synchronisation information from the synchronisation signal $SG_{Final}$ received by an item of equipment EQ1, EQ2 to synchronise to generate a return image cue,
- An LCH value maintenance system, which generates local samples $ECH_1$ from the values of a counting signal $SCPTI_1$ delivered by an image counter CPT at times defined by the return image cues,
- a sample summation device SOM, the SOM device receives the received samples $PCR_R$ and the local samples $ECH_1$, it delivers a sample total to the phase-locked loop $PLL_1$.

Advantageously, the local samples $ECH_1$ are obtained by a sampling of the counter signal $SCPTI_1$ realised at a rate set by the return image cues.

The local samples $ECH_1$ have a value that varies at a rate set by the return image cues. For example, when the sampling period $T_{ech}$ is 5 ms and the return image cue period is 40 ms, a same sample value $ECH_1$ will be totalled on 8 consecutive $PCR_R$ samples.

At a steady state, the local samples $ECH_1$ have an almost constant value.

The invention is described in the preceding text as an example. It is understood that those skilled in the art are capable of producing variants of the invention without leaving the scope of the patent.

The invention claimed is:

1. Reception device able to receive packets in a packet switching network comprising at least two stations, said device comprising:
   means for receiving packets containing samples from said network, said samples coming from data sampled every period, where the period is from a time base synchronised on all the stations of said network,
   means for regenerating a counting ramp using a phase-locked loop also delivering a reconstituted clock,
   means for initialising, at every zero-crossing of the counting ramp, an image counter, the rhythm of which is determined by the reconstituted clock,
   means for generating image cues at every zero-crossing of said counter, and
   means for reconstituting a synchronization signal from said image cues,
   means for transmitting the synchronization signal to an item of remote equipment to be synchronised wherein the device comprises:
   means for receiving a return synchronisation signal identical to the synchronisation signal received by the equipment,
   means for extracting return image cues from the return synchronisation signal,
   means for transmitting, to the phase-locked loop, a sum between the received sample and a sample of a counting signal delivered by the image counter.

2. Reception device according to claim 1, wherein the local samples are obtained by a sampling of the counter signal realised at a rate set by the return image cues.

* * * * *